United States Patent
Douglas et al.

(10) Patent No.: US 9,040,936 B1
(45) Date of Patent: May 26, 2015

(54) BUNCH LENGTH COMPRESSION METHOD FOR FREE ELECTRON LASERS TO AVOID PARASITIC COMPRESSIONS

(71) Applicant: JEFFERSON SCIENCE ASSOCIATES, LLC, Newport News, VA (US)

(72) Inventors: David R. Douglas, Yorktown, VA (US); Stephen Benson, Yorktown, VA (US); Dinh Cong Nguyen, Los Alamos, NM (US); Christopher Tennant, Williamsburg, VA (US); Guy Wilson, Norfolk, VA (US)

(73) Assignees: JEFFERSON SCIENCE ASSOCIATES, LLC, Newport News, VA (US); LOS ALAMOS NATIONAL SECURITY, LLC, Los Alamos, NM (US)

( * ) Notice: Subject to any disclaimer, the term of this patent is extended or adjusted under 35 U.S.C. 154(b) by 0 days.

(21) Appl. No.: 14/503,499

(22) Filed: Oct. 1, 2014

Related U.S. Application Data

(60) Provisional application No. 61/914,415, filed on Dec. 11, 2013.

(51) Int. Cl.
*H01J 3/12* (2006.01)
*H01S 3/09* (2006.01)

(52) U.S. Cl.
CPC .................................. *H01S 3/0903* (2013.01)

(58) Field of Classification Search
USPC ........................ 250/396 R; 315/507, 501, 505
See application file for complete search history.

(56) References Cited

U.S. PATENT DOCUMENTS

| | | | |
|---|---|---|---|
| 6,956,218 B1 * | 10/2005 | Douglas | 250/396 ML |
| 7,166,973 B1 * | 1/2007 | Douglas et al. | 315/500 |
| 8,217,596 B1 * | 7/2012 | Douglas et al. | 315/503 |

* cited by examiner

*Primary Examiner* — Kiet T Nguyen

(57) ABSTRACT

A method of bunch length compression method for a free electron laser (FEL) that avoids parasitic compressions by 1) applying acceleration on the falling portion of the RF waveform, 2) compressing using a positive momentum compaction ($R_{56}>0$), and 3) compensating for aberration by using nonlinear magnets in the compressor beam line.

3 Claims, 1 Drawing Sheet

BUNCH LENGTH COMPRESSION METHOD FOR FREE ELECTRON LASERS TO AVOID PARASITIC COMPRESSIONS

This application claims the priority of Provisional U.S. Patent Application Ser. No. 61/914,415 filed Dec. 11, 2013.

The United States Government may have certain rights to this invention under Management and Operating Contract No. DE-AC05-06OR23177 from the Department of Energy.

FIELD OF THE INVENTION

The present invention relates to free electron (FEL) laser beam electron drive beam quality and more particularly to a bunch length compression method for FELs for avoidance of parasitic compressions.

BACKGROUND OF THE INVENTION

Virtually all existing high energy (>few MeV) linac-driven FELs compress bunch length through use of off-crest acceleration on the rising side of the RF waveform (to induce an "energy chirp") followed by transport through a magnetic chicane. Some implementations use this method in conjunction with velocity compression of the low energy beam in the front end of the system. Though effective to some degree, this approach has at least three flaws: 1) it is difficult to correct aberration effects, particularly phase space distortion due to RF curvature. Typically harmonic RF is invoked in response, at considerable expense—and with the numerous difficulties attendant the use of high frequency resonant cavities; 2) acceleration on the rising side of the RF waveform exacerbates some aspects of longitudinal space charge (LSC) induced degradation of beam quality, resulting in reduced peak current when interacting with coherent synchrotron radiation (CSR) effects; and 3) chicanes, and all other achromatic "negative compaction" bunch length compressors (those with $R_{56}<0$, in which higher energy electrons travel a shorter distance than lower energy ones) necessarily create a parasitic compression of the bunch during the final compression process and expose the (somewhat over-compressed) bunch to interaction with coherent transition radiation from the end of the penultimate dipole of the compressor—exacerbating beam quality degradation from CSR.

Accordingly, it would be advantageous to provide a bunch length compression method for free electron lasers that avoids aberration effects, eliminates LSC induced degradation of beam quality, and avoids parasitic compressions of the bunch during the final compression process.

OBJECT OF THE INVENTION

It is therefore an object of the present invention to provide a bunch length compression method for free electron lasers that avoids aberration effects, eliminates LSC induced degradation of beam quality, and avoids parasitic compressions of the bunch during the final compression process.

SUMMARY OF THE INVENTION

According to the present invention there is provided a method of bunch length compression method for a free electron laser (FEL) that avoids parasitic compressions by 1) applying acceleration on the falling portion of the RF waveform, 2) compressing using a positive momentum compaction ($R_{56}>0$), and 3) compensating for aberrations by using nonlinear magnets in the compressor beam line.

DETAILED DESCRIPTION

Figure 1:
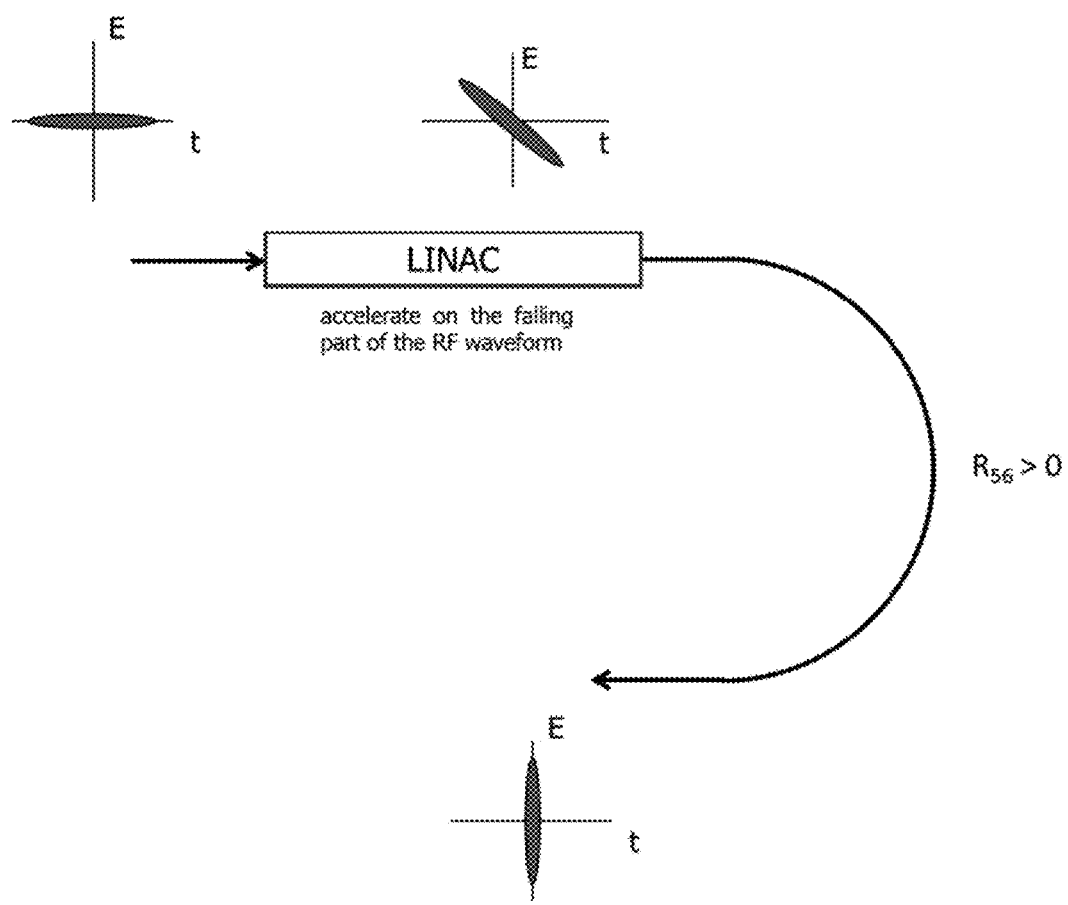
FIG. 1 is a schematic of the compression process in which a long, small energy spread bunch is accelerated on the falling side of the RF waveform and then compressed by transport through an arc with $R_{56}>0$.

Accelerating on the falling side of the RF waveform and using a compressor with positive momentum compaction has important implications:
1) Positive compaction is the natural result of bending and is readily achieved in simple beamline configurations (e.g. a FODO arc) supporting simple and effective schemes for aberration compensation, rendering harmonic RF unnecessary.
2) LSC-induced phase space distortion, on the falling side of the RF waveform, increases the phase-energy correlation on the beam. Thus, LSC enhances the chirp, rather than suppressing it (as occurs on the rising side of the RF waveform), where the suppression can result in a potentially incompressible region of phase space.
3) Compressors can be configured to avoid any spurious over-compression; the final compression occurs in the back end of the final compressor dipole. Parasitic compressions or "cross-overs" can be entirely avoided The bunch length compression method of the present invention avoids all of the aforementioned deficiencies by using acceleration on the falling side of the RF wave form and a compressor with positive momentum compaction ($R_{56}>0$, higher energy travels farther). This process is depicted schematically in FIG. 1. "Positive" compaction is the natural result of bending a beam—higher energy tends to go farther unless either dispersion is modulated and/or reverse bending is used. $R_{56}>0$ is thus readily achieved in simple beamline configurations (such as a FODO arc) supporting simple and effective schemes for aberration compensation (such as second order achromatic correction), rendering harmonic RF unnecessary.

LSC-induced phase space distortion tends, on the falling side of the RF waveform, to increase the phase-energy correlation on the beam. Thus, LSC "helps" the chirp process, rather than suppressing it, as occurs on the rising side of the RF waveform, where the suppression can result in a potentially incompressible region of phase space.

Compressors with $R_{56}>0$ (such as a simple, nonisochronous achromatic bend) can be configured to avoid any spurious over-compression; the final compression occurs in the back end of the final compressor dipole. This, together with techniques such as those described in U.S. Pat. No. 8,217,596, titled "Method of Controlling Coherent-Synchrotron Radiation-Driven Degradation of Beam Quality during Bunch Length Compression", will avoid the impact of CSR that is associated with parasitic compressions and mitigate beam quality degradation.

Thus, according to the present invention, a bunch length compression method for a free electron laser (FEL) that avoids parasitic compressions includes:
1) applying acceleration on the falling portion of the RF waveform,
2) compressing using a positive momentum compaction ($R_{56}>0$), 3) aberration compensation using nonlinear magnets in the compressor beam line.

Parasitic compressions can be avoided and the impact of CSR mitigated through use of the bunch length compression method of the present invention. Further tests were conducted with the Jefferson Lab UV Demo FEL, in Newport News, Va., in which 1) acceleration was accomplished on the falling side of the RF waveform, 2) compression was achieved by using positive momentum compaction $R_{56}$=0.2 m with 3) sextupole compensation of aberrations. An observed bunch length of 364 fsec FHWM—similar to values achieved on the rising side of the waveform with $R_{56}$<0—was observed. Analysis of the compression scheme using the program "ELEGANT" demonstrates that this method eliminated two of three parasitic compressions present during normal operation of the UV transport line. Quality of the beam resulting from this compression was validated by operation of the UV FEL with lasing at approximately 770 nm. Turn on time was in the range of 9-10 microseconds, with a detuning curve 10-11 microns long. These numbers are consistent with the performance using the conventional longitudinal match, and indicate an FEL gain of approximately 230% despite only rough optimization of the longitudinal phase space and no optimization of the transverse match.

These experimental results achieved by the bunch length compression method for FELs for avoidance of parasitic compressions indicate that this method will serve as a robust basis for the design of bunch compressors for coherent sources across the frequency spectrum, from small laboratory/industrial systems to large facilities such as x-FELs, and including high power systems for industrial processing and defense applications.

Bunch compressors are necessary in all manners of $4^{th}$ generation light sources, spanning the electromagnetic spectrum. The bunch length compression method of the present invention alleviates a number of limits associated with prior art compressors. The method of the present invention avoids parasitic compressions, preserves the beam quality, and mitigates collective effects. The method of the present invention can be applied to improve the operation of compact coherent and x-ray sources and linac-driven free electron lasers. The principles of the method of the current invention can be applied to the construction of 1) compact light sources for research and industry, 2) high power FELs, and 3) large facilities for synchrotron radiation, such as x-FELs.

What is claimed is:

1. A method for compressing the bunch length of a free electron laser (FEL) comprising:
    a. providing an FEL including an RF waveform with a falling portion;
    b. applying acceleration on the falling portion of the RF waveform;
    c. compressing using a positive momentum compaction ($R_{56}$>0); and
    d. applying aberration compensation.

2. The method of claim 1 wherein the aberration compensation is applied by one or more nonlinear magnets in a compressor beam line.

3. The method of claim 1 wherein the aberration compensation is applied by one or more sextupole magnets in a compressor beam line.

* * * * *